United States Patent
Jania et al.

(10) Patent No.: US 8,014,883 B2
(45) Date of Patent: Sep. 6, 2011

(54) TEMPLATES AND STYLE SHEETS FOR AUDIO BROADCASTS

(75) Inventors: Frank Lawrence Jania, Chapel Hill, NC (US); Darren Mark Shaw, Fareham (GB)

(73) Assignee: International Business Machines Corporation, Armonk, NY (US)

( * ) Notice: Subject to any disclaimer, the term of this patent is extended or adjusted under 35 U.S.C. 154(b) by 890 days.

(21) Appl. No.: 11/619,388

(22) Filed: Jan. 3, 2007

(65) Prior Publication Data

US 2008/0161949 A1   Jul. 3, 2008

(51) Int. Cl.
*G06F 17/00* (2006.01)
(52) U.S. Cl. .......................... 700/94; 715/200
(58) Field of Classification Search ............ 700/94; 715/200–204
See application file for complete search history.

(56) References Cited

U.S. PATENT DOCUMENTS

| | | | |
|---|---|---|---|
| 5,899,975 A | 5/1999 | Nielsen | |
| 2004/0111676 A1 | 6/2004 | Jang et al. | |
| 2004/0139480 A1 | 7/2004 | Delpuch et al. | |
| 2006/0268667 A1 | 11/2006 | Jellison, Jr. et al. | |
| 2007/0038938 A1* | 2/2007 | Canora et al. | 715/731 |
| 2007/0234214 A1* | 10/2007 | Lovejoy et al. | 715/719 |

FOREIGN PATENT DOCUMENTS

| | | |
|---|---|---|
| EP | 1 491 994 A1 | 12/2004 |
| WO | WO 0039997 | 7/2000 |

OTHER PUBLICATIONS

W3C Recommendation, CSS2 Specification § 19 Aural Style Sheets, http://www.w3.org/TR/1998/REC-CSS2-19980512/aural.html, May 12, 1998.*
Beged et al., RDF Site Summary (RSS) 1.0 (published online Dec. 9, 2000) (retrieved from http://web.resource.org/rss/1.0/spec on Nov. 21, 2010).*
Alfonsi, Benjamin, "Blinkx Ups the Ante in the Search and RSS Markets", IEEE Distributed Systems Online, vol. 6, No. 8, Aug. 2005, pp. 1-2.
Jacobson et al., "Linguistic documents synchronizing sound and text", Speech Communication, vol. 33, No. 1-2, Jan. 2001, pp. 1-18.
Day, Neil et al., "Audio-Visual (AV) Style Sheets in MPEG-7 Applications: A Proposal", Video Standards and Drafts, XX, XX, No. M5825, Mar. 13, 2000, 28 pages.

* cited by examiner

*Primary Examiner* — Walter F Briney, III
(74) *Attorney, Agent, or Firm* — Stephen R. Tkacs; Stephen J. Walder, Jr.; Matthew C. Zehrer (57) ABSTRACT

An audio broadcast creation client applies the concept of style sheets to audio data intended for audio broadcasts. The creation client associates style sheet elements to sections of the audio broadcast. An audio broadcast rendering engine applies the style sheet elements at runtime to alter or enhance sections of the audio broadcast. Different style sheets may be applied to the same raw audio broadcast data to alter the end result. A template is provided for generating audio broadcasts. The user may record the appropriate audio files and refer to these audio files in fields of the audio broadcast template.

21 Claims, 7 Drawing Sheets

```
<podcast>
<style src="/styles/podcast/corpstyle.style">
<section id="title">
    <audio src="../podcast/episode003/title.mp3"/>
</section>
<section> id="intro">
    <audio src="../podcast/episode003/intro.mp3"/>
</section>
<section id="body">
    <heading id="h1">
        <audio src="../podcast/episode003/maincontent1.mp3"/>
    </heading>
    <heading id="h1">
        <audio src="../podcast/episode003/maincontent2.mp3"/>
    </heading>
    <heading id="h3">
        <audio src="../podcast/episode003/maincontent3.mp3"/>
    </heading>
</section>
<section id="summary">
    <audio src="../podcast/episode003/summary.mp3"/>
<section>
<section id="legal"/>
<section id="close"/>
</podcast>
```

FIG. 6

```
title {
        foreground-volume: 100%;
        background-volume: 100%;
        background-audio-file: url(../audio/title.mp3);
        mix: sequential-pre;
} intro {
        foreground-volume: 100%;
        background-volume: 50%;
        background-audio-file: url(../audio/funkyintro.mp3);
        mix: overlapping;
} body {
        foreground-volume: 100%;
} summary {
        foreground-volume: 100%;
        background-volume: 100%;
        background-audio-file: url(../audio/summary.mp3);
        mix: sequential-post;
} h1 {
        foreground-volume: 100%;
        background-volume: 100%;
        background-audio-file: url(../audio/ping.mp3);
        mix: sequential-pre;
} legal {
        foreground-audio-file: url(../audio/standardlegal.mp3);
} close {
        foreground-audio-file: url(../audio/closing.mp3);
}
```

FIG. 7

```
<podcast>
<style src="/styles/podcast/corpstyle.style">
702 {  <section id="title">
          <audio src="[insert title audio]"/>  ⟋712
       </section>
704 {  <section> id="intro">
          <audio src="[insert intro audio]"/>  ⟋714
       </section>
706 {  <section id="body">
          <heading id="h1">
             <audio src="[insert body content]"/>  ⟋716
          </heading>
          <heading id="h3">
             <audio src="[insert body content]"/>  ⟍726
          </heading>
       </section>
708 {  <section id="summary">
          <audio src="[insert summary content]"/>  ⟍718
       <section>
       <section id="legal"/>  ⟍710
       <section id="close"/>  ⟍712
</podcast>
```

FIG. 8

TEMPLATES AND STYLE SHEETS FOR AUDIO BROADCASTS

BACKGROUND

1. Technical Field

The present application relates generally to an improved data processing system and method. More specifically, the present application is directed to a method, apparatus, and program product for applying templates and style sheets to audio broadcasts.

2. Description of Related Art

Many computer users are creating audio broadcasts that are converted to an audio file format for playback in a digital music player. One example of an audio broadcast is a Podcast®. Using the really simple syndication (RSS) format, these audio broadcasts are made available to subscribers just like news feeds. A client program captures the audio feeds and synchronizes them with the digital music player.

The creation of audio broadcasts has exploded in recent years as the technology to create them exists on personal computers. Audio broadcasts are typically of the home-brew variety and lack consistency across episodes, departments, and companies. This often leads to audio broadcasts leaving a less than professional impression on the listener. The lack of consistent style can also mean that it is difficult to recognize the individual or organization that is responsible for the broadcast as it is being played.

Some organizations do impose a style on their audio broadcasts. However, this is done manually by directly modifying the audio broadcast. This styling does not keep the style and content separate; therefore, it is difficult, if not impossible to modify the style at a later point in time. Manually styling audio broadcasts also involves a great deal of redundant effort.

SUMMARY

In one illustrative embodiment, a computer program product comprising a non-transitory computer recordable medium having a computer readable program recorded thereon is provided. The computer readable program, when executed on a computing device, causes the computing device to receive an audio broadcast style sheet. The audio broadcast style sheet sets one or more style attributes for at least one section of the audio broadcast. The computer readable program further causes the computing device to receive a marked up audio broadcast file. The marked up audio broadcast file refers to the audio broadcast style sheet. The marked up audio broadcast file comprises at least one tag that delineates at least one section that corresponds to the at least one section in the audio broadcast style sheet. The marked up audio broadcast file refers to at least one audio file for the at least one section. The computer readable program further causes the computing device to parse the marked up audio broadcast file consulting the audio broadcast style sheet and render each section of the audio broadcast based on the marked up audio broadcast file, the at least one audio file, and the audio broadcast style sheet to form a rendered audio broadcast. The computer readable program further causes the computing device to send the rendered audio broadcast to a client device that subscribes to the audio broadcast using a syndication format.

In another illustrative embodiment, a data processing system is provided for creating an audio broadcast. The data processing system comprises a processor and a memory coupled to the processor. The memory contains instructions which, when executed by the processor, cause the processor to receive an audio broadcast style sheet. The audio broadcast style sheet sets one or more style attributes for at least one section of the audio broadcast. The instructions may further cause the processor to receive a marked up audio broadcast file. The marked up audio broadcast file refers to the audio broadcast style sheet, and the marked up audio broadcast file comprises at least one tag that delineates at least one section that corresponds to the at least one section in the audio broadcast style sheet. The marked up audio broadcast file refers to at least one audio file for the at least one section. The instructions may further cause the processor to parse the marked up audio broadcast file consulting the audio broadcast style sheet and render each section of the audio broadcast based on the marked up audio broadcast file, the at least one audio file, and the audio broadcast style sheet to form a rendered audio broadcast. The instructions may further cause the processor to send the rendered audio broadcast to a client device that subscribes to the audio broadcast using a syndication format.

In further exemplary embodiments, the memory may contain instructions which, when executed by the processor, cause the processor to perform one or more of the operations described above with regard to the computer readable program.

In further exemplary embodiments, the memory may contain instructions which, when executed by the processor, cause the processor to perform one or more of the operations described above with regard to the computer readable program.

In another illustrative embodiment, a method is provided for creating an audio broadcast. The method comprises receiving an audio broadcast style sheet. The audio broadcast style sheet sets one or more style attributes for at least one section of the audio broadcast. The method further comprises receiving a marked up audio broadcast file. The marked up audio broadcast file refers to the audio broadcast style sheet. The marked up audio broadcast file comprises at least one tag that delineates at least one section that corresponds to the at least one section in the audio broadcast style sheet. The marked up audio broadcast file refers to at least one audio file for the at least one section. The method further comprises parsing the marked up audio broadcast file consulting the audio broadcast style sheet and rendering each section of the audio broadcast based on the marked up audio broadcast file, the at least one audio file, and the audio broadcast style sheet to form a rendered audio broadcast. The method further comprises sending the rendered audio broadcast to a client device that subscribes to the audio broadcast using a syndication format.

In further exemplary embodiments, the method may comprise one or more of the operations described above with regard to the computer readable program.

These and other features and advantages of the present invention will be described in, or will become apparent to those of ordinary skill in the art in view of, the following detailed description of the exemplary embodiments of the present invention.

BRIEF DESCRIPTION OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION OF THE ILLUSTRATIVE EMBODIMENTS

Figure 1:
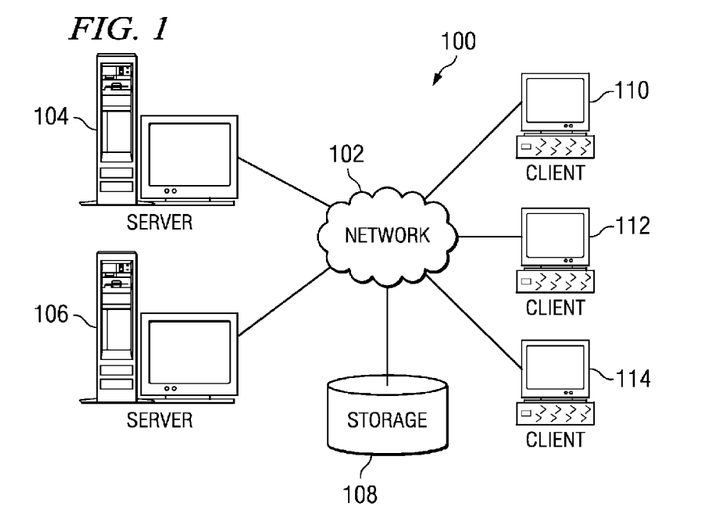
FIG. 1 depicts a pictorial representation of an exemplary distributed data processing system in which aspects of the illustrative embodiments may be implemented.
Figure 2:
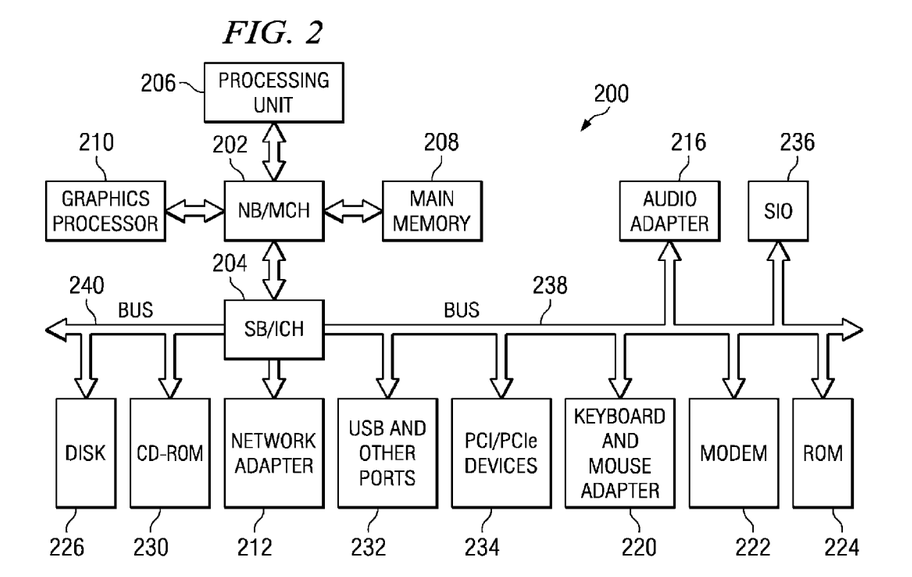
FIG. 2 is a block diagram of an exemplary data processing system in which aspects of the illustrative embodiments may be implemented.

With reference now to the figures and in particular with reference to FIGS. 1-2, exemplary diagrams of data processing environments are provided in which embodiments of the present invention may be implemented. It should be appreciated that FIGS. 1-2 are only exemplary and are not intended to assert or imply any limitation with regard to the environments in which aspects or embodiments of the present invention may be implemented. Many modifications to the depicted environments may be made without departing from the spirit and scope of the present invention.

With reference now to the figures, FIG. 1 depicts a pictorial representation of an exemplary distributed data processing system in which aspects of the illustrative embodiments may be implemented. Distributed data processing system 100 may include a network of computers in which embodiments of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

More particularly, a user of a client, such as client 110, may create an audio broadcast. The user may upload the audio broadcast to a server, such as server 104, and provide access to the audio broadcast to other users. The other users may download the audio broadcast to clients, such clients 112, 114, for presentation. Alternatively, the server may stream the audio broadcast to listeners.

In another embodiment, users may subscribe to an audio broadcast using, for example, a syndication format, such as really simple syndication (RSS). When an audio broadcast is available at the server, an audio broadcast capture client may automatically download the audio broadcast for the subscribing user. The audio broadcast capture client may also synchronize the audio file of the broadcast with a portable media player.

In accordance with an illustrative embodiment, an audio broadcast creation client applies the concept of style sheets to audio data intended for audio broadcasts. The creation client associates style sheet elements to sections of the audio broadcast. An audio broadcast rendering engine then applies the style sheets at runtime to alter or enhance the audio broadcast. Different style sheets may be applied to the same raw audio broadcast data to alter the end result.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

With reference now to FIG. 2, a block diagram of an exemplary data processing system is shown in which aspects of the illustrative embodiments may be implemented. Data processing system 200 is an example of a computer, such as server 104 or client 110 in FIG. 1, in which computer usable code or instructions implementing the processes for illustrative embodiments of the present invention may be located.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206. The operating system coordinates and provides control of various components within the data processing system 200 in FIG. 2. As a client, the operating system may be a commercially available operating system such as Microsoft® Windows® XP (Microsoft and Windows are trademarks of Microsoft Corporation in the United States, other countries, or both). An object-oriented programming system, such as the Java™ programming system, may run in conjunction with the operating system and provides calls to the operating system from Java™ programs or applications executing on data processing system 200 (Java is a trademark of Sun Microsystems, Inc. in the United States, other countries, or both).

As a server, data processing system 200 may be, for example, an IBM® eServer™ pSeries® computer system, running the Advanced Interactive Executive (AIX®) operating system or the LINUX® operating system (eServer, pSeries and AIX are trademarks of International Business Machines Corporation in the United States, other countries, or both while LINUX is a trademark of Linus Torvalds in the United States, other countries, or both). Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for illustrative embodiments of the present invention may be performed by processing unit 206 using computer usable program code, which may be located in a memory such as, for example, main memory 208, ROM 224, or in one or more peripheral devices 226 and 230, for example.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device which is configured with flash memory to provide non-volatile memory for storing operating system files and/or user-generated data, for example. Essentially, data processing system 200 may be any known or later developed data processing system without architectural limitation.

Figure 3:
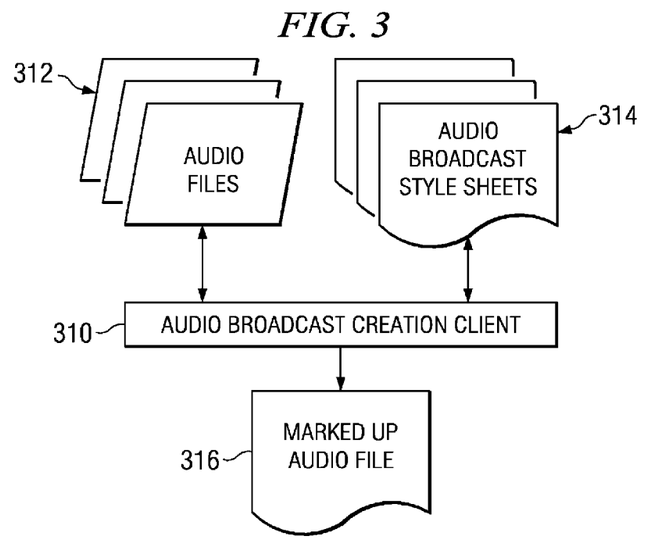
FIG. 3 is a block diagram illustrating an audio broadcast creation client in accordance with an illustrative embodiment.

FIG. 3 is a block diagram illustrating an audio broadcast creation client in accordance with an illustrative embodiment. Audio broadcast creation client may exist, for example, at a client device, such as one of clients 110-114 in FIG. 1. Audio broadcast creation client receives one or more audio files 312 for an audio broadcast. These audio files 312 may be sections of an audio broadcast, such as an introduction, chapters, a summary, and so forth. The entire audio broadcast may be provided in a single audio file or the audio broadcast may be broken up into many audio files depending upon the implementation or the preferences of the user.

A user of audio broadcast creation client 310 may select one of audio broadcast style sheets 314. Aural style sheets are part of the W3 standard; however, in the prior art, aural style sheets describe how an automatic screen reader should render text audibly. In accordance with the illustrative embodiments, these aural style sheets are modified to be applied to audio broadcasts, which already exist in an audio format.

The user generates a marked up audio file 316 using audio broadcast creation client 310. Marked up audio file 316 references the selected audio broadcast style sheet and delineates the audio broadcast into sections, such as title, introduction, body, summary, etc. The sections of the marked up audio file correspond to the audio broadcast style sheet.

In one exemplary embodiment, a user may select different audio broadcast style sheets to change the manner in which the audio broadcast is presented. For example, a user may select a first an audio broadcast style sheet using a trial-and-error approach. In an alternative embodiment, an organization may provide a style sheet, or set of style sheets, to the user to ensure that audio broadcasts are consistent throughout the organization.

Figure 4:
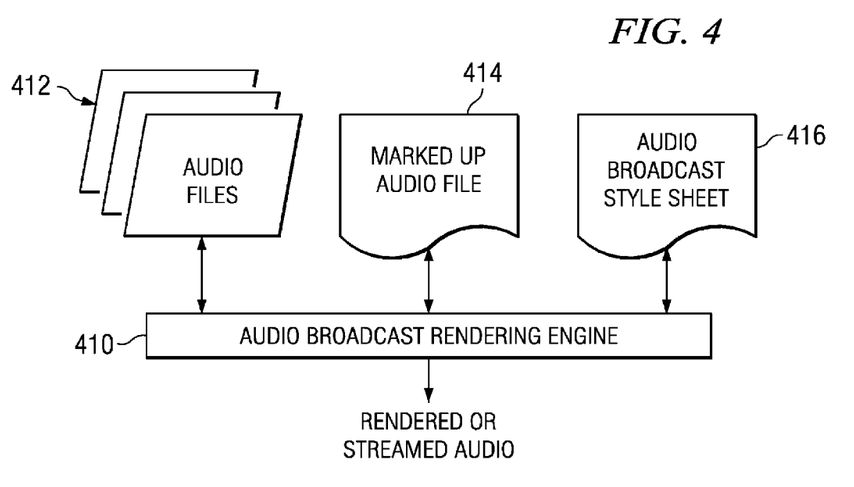
FIG. 4 is a block diagram illustrating an audio broadcast rendering engine in accordance with an illustrative embodiment.

FIG. 4 is a block diagram illustrating an audio broadcast rendering engine in accordance with an illustrative embodiment. At runtime, audio broadcast rendering engine 410 receives audio files 412, marked up audio file 414, and audio broadcast style sheet 416 and renders the audio broadcast. Audio broadcast rendering engine 410 parses marked up audio file 414 and audio broadcast style sheet 416 and applies style sheet elements to corresponding sections of the audio broadcast.

Audio broadcast rendering engine 410 may exist on a client device, such as one of clients 110-114 in FIG. 1, for example. In fact, audio broadcast creation client 310 in FIG. 3 and audio broadcast rendering engine 410 may exist on the same client device within the same audio broadcast development platform. A user may use audio broadcast rendering engine 410 to generate a final audio file for the audio broadcast, which may then be distributed or made available for download.

In an alternative embodiment, audio broadcast rendering engine 410 may exist on a server device, such as server 104 in FIG. 1, for example. The user may upload audio files 412 and marked up audio file 414, and audio broadcast rendering engine 410 may generate the final audio file, which may be downloaded or pushed to subscribing users. In yet another exemplary embodiment, audio broadcast rendering engine 410 may stream the final audio broadcast to client devices.

Figure 5:
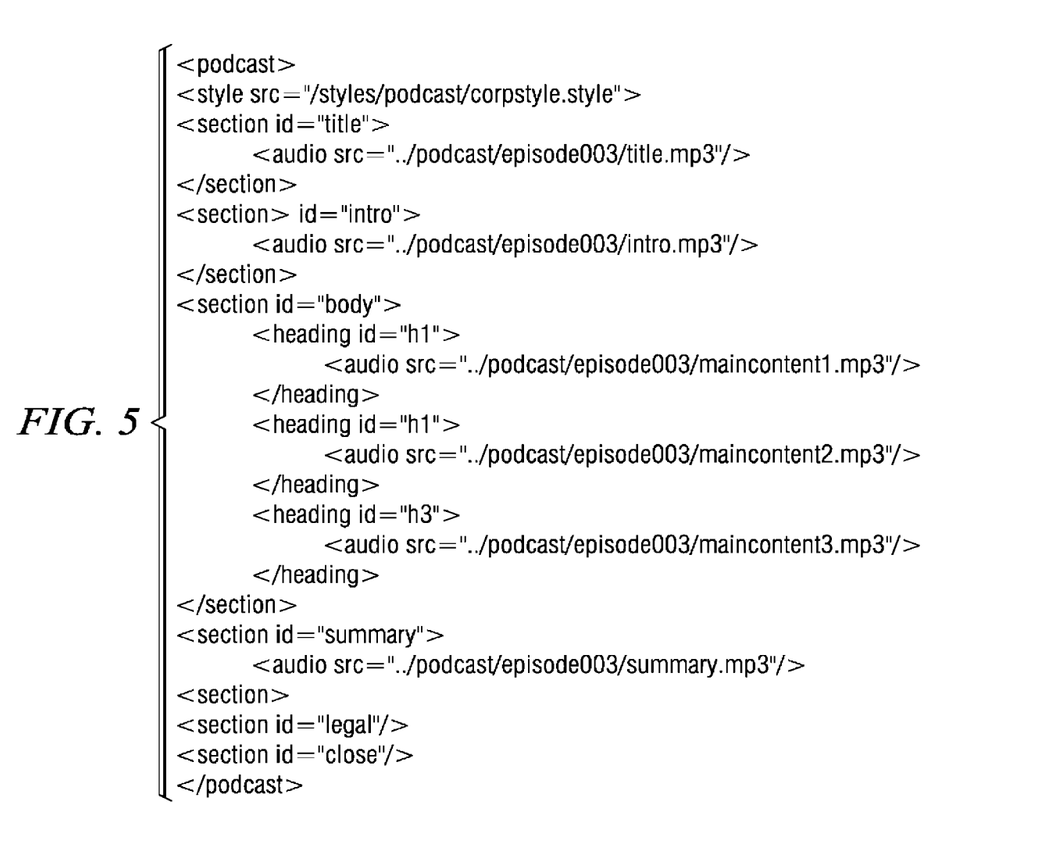
FIG. 5 depicts an example marked up audio file for an audio broadcast in accordance with an illustrative embodiment.

FIG. 5 depicts an example marked up audio file for an audio broadcast in accordance with an illustrative embodiment. In the depicted example, the audio broadcast is a Podcast®, as designated by the <podcast> tag. The marked up audio file describes sections of the audio broadcast using extensible markup language (XML). The marked up audio file uses a <style> tag to refer to an audio broadcast style sheet.

The marked up audio file in the depicted example uses a <section> tag to delineate sections of the audio broadcast.

These sections correspond to sections of the audio broadcast style sheet, as will be described in further detail below with respect to FIG. 6. In the depicted example, the sections include "title," "intro," "body," "summary," "legal," and "close." Under the "body" section, there are three sub-sections delineated by a <heading> tag, two marked as "h1" headings and one marked as a "h3" heading.

In the depicted example, the marked up audio file is a separate file that refers to a set of audio files for the audio broadcast. In an alternative embodiment, the marked up audio file may be a single audio file with meta data incorporated therein. A person of ordinary skill in the art will recognize that the marked up audio file shown in FIG. 5 is intended to illustrate an example, and is not meant to imply limitations to the possible tags, sections, or attributes that may be used in a marked up audio file for audio broadcasts.

Figure 6:
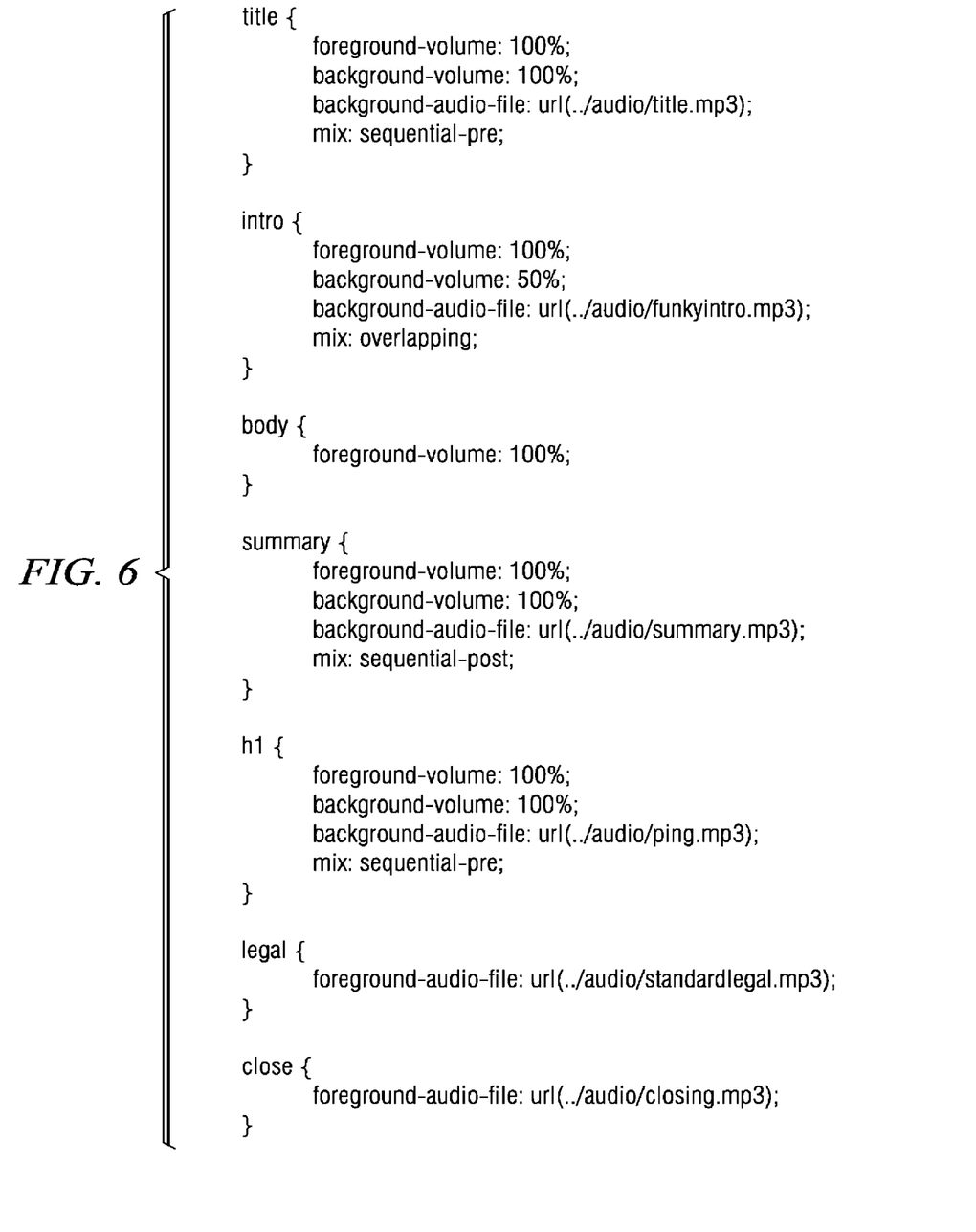
FIG. 6 depicts an example audio broadcast style sheet in accordance with an illustrative embodiment.

FIG. 6 depicts an example audio broadcast style sheet in accordance with an illustrative embodiment. In the depicted example, the audio broadcast uses a syntax similar to cascading style sheets (CSS) or aural style sheets, which are generally known in the prior art. The example audio broadcast style sheet shown in FIG. 6 provides style sheet elements for the "title," "intro," "body," "summary," "h1," "legal," and "close" sections.

For the "title" section, the audio broadcast style sheet sets the foreground volume to 100%, sets the background volume to 100%, and designates an audio file to be used for background audio. An audio section may have multiple layers of audio (foreground/background) that may be played sequentially or layered on top of one another. For example, the "title" section defines the "mix" attribute to be "sequential-pre," which indicates that the background element is to be played before the content it is enclosing.

For the "intro" section, the audio broadcast style sheet sets the foreground volume to 100%, sets the background volume to 50%, and designates a background audio file. The "intro" section sets the "mix" attribute to "overlap," which indicates that the background audio is to be played over the top of the foreground audio.

In the "body" section, the audio broadcast style sheet only sets the foreground volume to 100%. However, notice that the "h1" section sets the background volume to 100%, designates a background audio file, and sets the "mix" attribute to "sequential-pre." The "h1" section overrides the attributes of the "body" section. On the other hand, because there is no "h3" section, when the audio broadcast rendering engine renders an "h3" section of audio, the attributes default to those for the "body" section.

The "summary" section of the audio broadcast style sheet sets the foreground volume to 100%, sets the background volume to 100%, and designates a background audio file. The "summary" section also sets the "mix" attribute to "sequential-post," which indicates that the background element is to be played after the foreground element.

The "legal" and "close" sections designate foreground audio files. These sections may be used by an organization to ensure that all audio broadcasts within the organization include the same legal and closing information. As such, the foreground "legal" and "close" sections may have the foreground volume, background volume, background audio, and mixing permanently set in the foreground audio file. The user need not record audio for the "legal" and "close" section as long as the marked up audio file is encoded appropriately. In an alternative embodiment, the "legal" and "close" sections of the audio broadcast style sheet may set attributes similar to the other sections.

Figure 7:
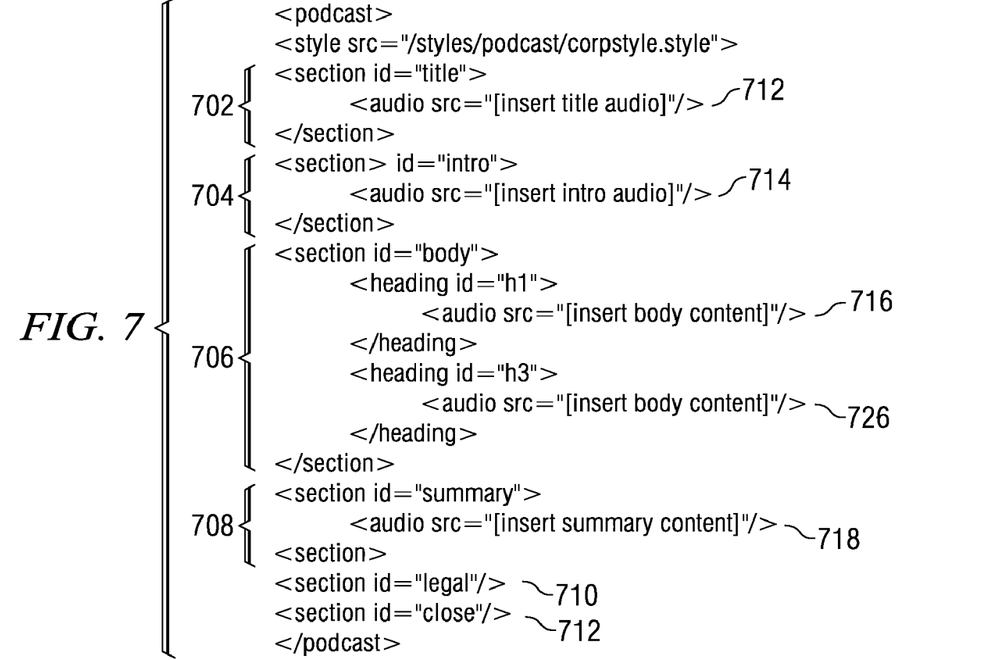
FIG. 7 depicts an example audio broadcast template in accordance with an illustrative embodiment.

FIG. 7 depicts an example audio broadcast template in accordance with an illustrative embodiment. The audio broadcast template may be derived from the marked up audio file illustrated in FIG. 5, for example. The audio broadcast template refers to an audio broadcast style sheet using the <style> tag. The audio broadcast template includes "title" section 702, "intro" section 704, "body" section 706, "summary" section 708, "legal" section 710, and "close" section 712.

In the depicted example, the audio broadcast template includes fields for entering the audio file information for the various sections. For example, field 712 allows the user to designate an audio file for "title" section 702. Similarly, field 714 and field 718 allow the user to designate audio files for "intro" section 704 and "summary" section 708, respectively. Body section 706 includes fields 716 and 726 for the "h1" heading and field 708 for "h3" heading. The "body" section may include one or more "h1" heading sections and one or more "h3" sections.

The user may use the template shown in FIG. 7 to generate an audio broadcast. The user may record the appropriate audio files and refer to these audio files in fields 712, 714, 716, 718, 726. The user need not generate a full mark up file for every audio broadcast. Furthermore, the user need not be concerned at all with the style, because the style is handled separately by the audio broadcast style sheet. Using an audio broadcast template file and an audio broadcast style sheet, a user may generate many audio broadcasts that are consistent in form and style.

Figure 8:
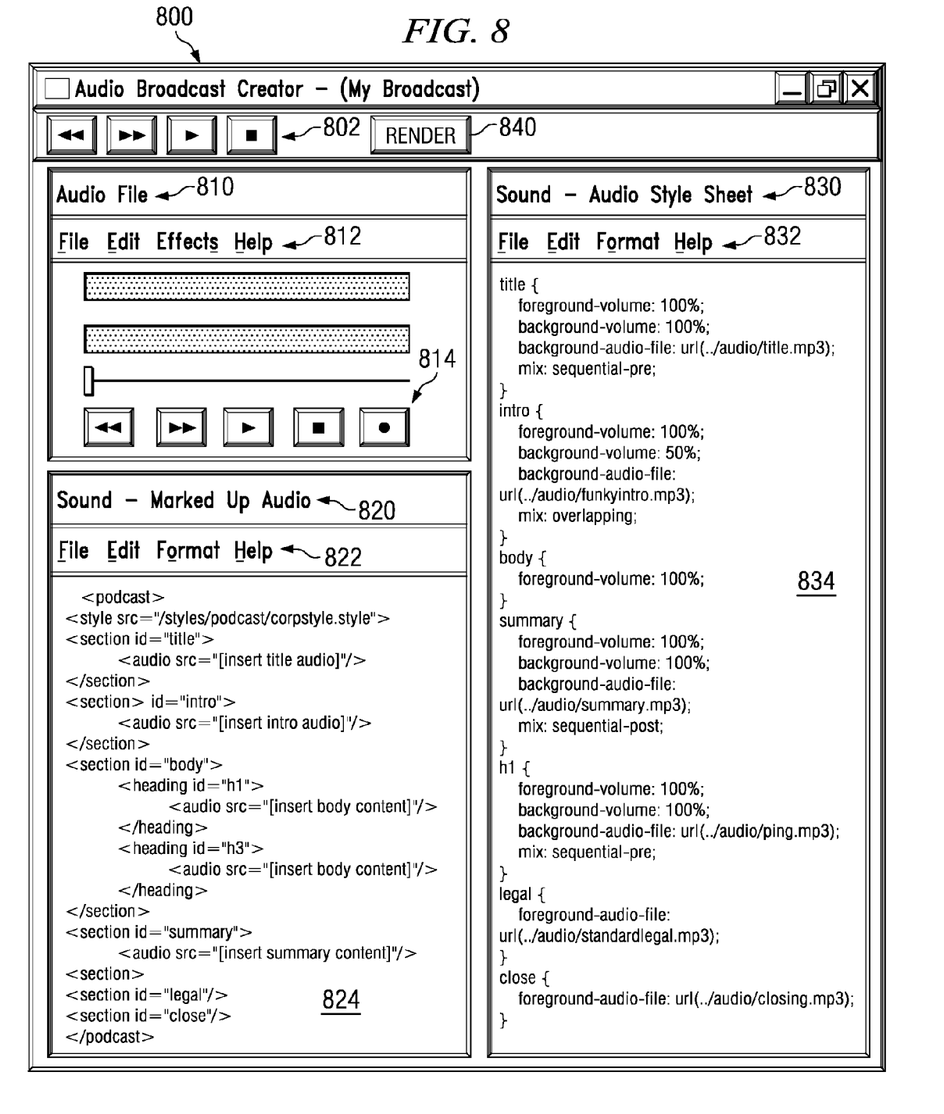
FIG. 8 shows an example user interface for an audio broadcast creator tool in accordance with an illustrative embodiment.

FIG. 8 shows an example user interface for an audio broadcast creator tool in accordance with an illustrative embodiment. Audio broadcast creator tool interface window 800 includes controls 802, audio file editor portion 810, marked up audio editor portion 820, and audio style sheet portion 830.

Marked up audio editor portion 820 may include menu bar 822 and marked up audio file display area 824. In one exemplary embodiment, marked up audio editor portion 820 may provide a simple text editor. Alternatively, marked up audio editor 820 may include development tools that may include graphical controls within display area 824 or may include menu-based controls that are accessed through menu bar 822. For example, the user may open a template in marked up audio editor portion 820 and enter the audio file information directly into the audio file information fields using text field controls.

In another exemplary embodiment, the user may record the audio files using audio file editor portion 810. The user may record, play back, fast forward, rewind, and stop the audio for the audio broadcast using controls 814.

Audio style sheet editor portion 830 may include menu bar 832 and audio style sheet editor portion 834. Audio style sheet editor portion 830 may provide a simple text editor. Alternatively, audio style sheet editor 830 may include graphical controls within display area 834 or may include menu-based controls that are accessed through menu bar 832. Audio style sheet display portion 834 may automatically present the audio broadcast style sheet referenced in the marked up audio file open in marked up audio editor portion 820.

During audio broadcast creation, the user may preview the audio broadcast using controls 802. Thus, the user may edit portions of the audio broadcast by editing the audio files in audio file editor portion 810, by editing the marked up audio file in marked up audio editor portion 820, or by editing the audio broadcast style sheet in audio style sheet portion 830. In one exemplary embodiment, when the user is satisfied with the audio broadcast, the user may render the audio broadcast into a single audio file using "render" button 840.

Figure 9:
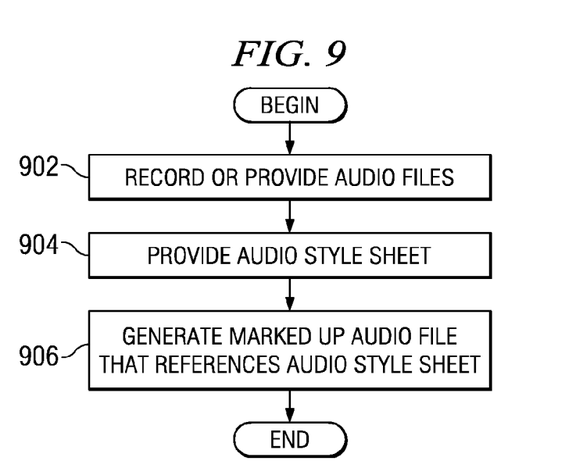
FIG. 9 is a flowchart illustrating operation of an audio broadcast creation client in accordance with an illustrative embodiment.

FIG. 9 is a flowchart illustrating operation of an audio broadcast creation client in accordance with an illustrative embodiment. It will be understood that each block of the flowchart illustration, and combinations of blocks in the flowchart illustration, can be implemented by computer program instructions. These computer program instructions may be provided to a processor or other programmable data processing apparatus to produce a machine, such that the instructions which execute on the processor or other programmable data processing apparatus create means for implementing the functions specified in the flowchart block or blocks. These computer program instructions may also be stored in a computer-readable memory or storage medium that can direct a processor or other programmable data processing apparatus to function in a particular manner, such that the instructions stored in the computer-readable memory or storage medium produce an article of manufacture including instruction means which implement the functions specified in the flowchart block or blocks.

Accordingly, blocks of the flowchart illustration support combinations of means for performing the specified functions, combinations of steps for performing the specified functions and program instruction means for performing the specified functions. It will also be understood that each block of the flowchart illustration, and combinations of blocks in the flowchart illustration, can be implemented by special purpose hardware-based computer systems which perform the specified functions or steps, or by combinations of special purpose hardware and computer instructions.

With reference to FIG. 9, operation begins and the user records or provides audio files for the audio broadcast (block 902). The user then provides an audio style sheet for the audio broadcast (block 904). Then, the audio broadcast creation client generates a marked up audio file that references the audio style sheet (block 906). Thereafter, operation ends. The marked up audio file also delineates the audio broadcast into sections that correspond to sections in the audio broadcast style sheet. The audio broadcast style sheet sets attributes for the sections of the audio broadcast.

Figure 10:
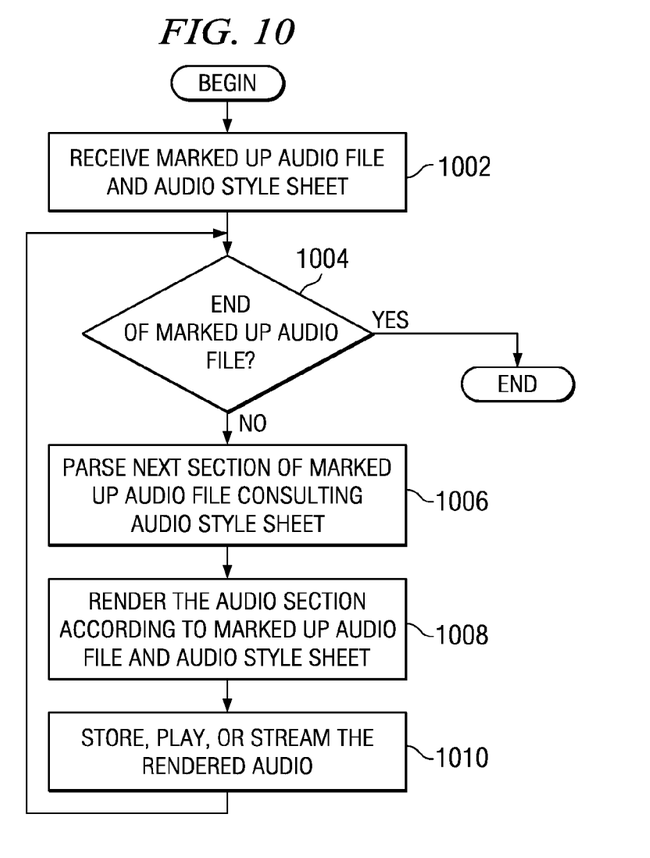
FIG. 10 is a flowchart that illustrates the operation of an audio broadcast rendering engine in accordance with an illustrative embodiment.

FIG. 10 is a flowchart that illustrates the operation of an audio broadcast rendering engine in accordance with an illustrative embodiment. Operation begins and the audio broadcast rendering engine receives a marked up audio file and an audio style sheet (block 1002). The marked up audio file may be a single audio file with meta data incorporated therein, or a meta data file that refers to a set of separate audio files.

The audio broadcast rendering engine determines whether the end of the marked up audio file is reached (block 1004). If the end of the marked up audio file is reached, operation ends. If the audio broadcast rendering engine has not reached the end of the marked up audio file in block 1004, the rendering engine parses the next section of the marked up audio file, consulting the audio broadcast style sheet (block 1006). Then, the rendering engine renders the audio section according to the marked up audio file and the audio style sheet (block 1008). The rendering engine then stores, plays, or streams the rendered audio (block 1010). Thereafter, operation returns to block 1004 to determine if the end of the marked up audio file is reached.

Thus, the illustrative embodiments solve the disadvantages of the prior art by providing an audio broadcast creation client that applies the concept of style sheets to audio data intended for audio broadcasts. The creation client associates style sheet elements to sections of the audio broadcast. An audio broadcast rendering engine applies the style sheet elements at runtime to alter or enhance sections of the audio broadcast. Different style sheets may be applied to the same raw audio broadcast data to alter the end result.

A template is provided for generating audio broadcasts. The user may record the appropriate audio files and refer to these audio files in fields of the audio broadcast template. The user need not generate a full mark up file for every audio broadcast. Also, the user need not be concerned at all with the style, because the style is handled separately by the audio broadcast style sheet. Using an audio broadcast template file and an audio broadcast style sheet, a user may generate many audio broadcasts that are consistent in form and style.

It should be appreciated that the illustrative embodiments may take the form of an entirely hardware embodiment, an entirely software embodiment or an embodiment containing both hardware and software elements. In one exemplary embodiment, the mechanisms of the illustrative embodiments are implemented in software, which includes but is not limited to firmware, resident software, microcode, etc.

Furthermore, the illustrative embodiments may take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

The medium may be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer program product comprising a non-transitory computer recordable medium having a computer readable program recorded thereon, wherein the computer readable program, when executed on a server computing device, causes the computing device to:
receive an audio broadcast style sheet from a client computing device, wherein the audio broadcast style sheet sets one or more style attributes for at least one section of the audio broadcast;
receive a marked up audio broadcast file from the client computing device, wherein the marked up audio broadcast file refers to the audio broadcast style sheet and comprises at least one tag that delineates at least one section that corresponds to the at least one section in the audio broadcast style sheet and wherein the marked up audio broadcast file refers to at least one audio file for the at least one section;
parse the marked up audio broadcast file consulting the audio broadcast style sheet;
render each section of the audio broadcast based on the marked up audio broadcast file, the at least one audio file, and the audio broadcast style sheet to form a rendered audio broadcast;
store the rendered audio broadcast in a storage device at the server computing device; and
send the rendered audio broadcast to client devices that subscribe to the audio broadcast using a syndication format.

2. The computer program product of claim 1, wherein receiving the marked up audio broadcast file comprises:
generating the marked up audio broadcast file in an editor.

3. The computer program product of claim 2, wherein generating the marked up audio broadcast file comprises:
receiving a template marked up audio file in the editor; and
editing the template marked up audio file to form the marked up audio broadcast file.

4. The computer program product of claim 1, wherein the one or more style attributes comprise a foreground volume attribute that sets a foreground volume level for a foreground audio file for a given section of the audio broadcast.

5. The computer program product of claim 1, wherein the one or more style attributes comprise a background volume attribute that sets a background volume level for a background audio file for a given section of the audio broadcast.

6. The computer program product of claim 1, wherein the one or more style attributes comprise a background file attribute that sets a background audio file for a given section of the audio broadcast.

7. The computer program product of claim 1, wherein the one or more style attributes comprise a mix attribute that sets a mixing type for a given section of the audio broadcast, wherein rendering each section of the audio broadcast comprises mixing a background audio file and a foreground audio file for the given section based on the mix attribute.

8. A server data processing system for creating an audio broadcast, the server data processing system comprising:
a processor; and
a memory coupled to the processor, wherein the memory contains instructions which, when executed by the processor, cause the processor to:
receive an audio broadcast style sheet from a client computing device, wherein the audio broadcast style sheet sets one or more style attributes for at least one section of the audio broadcast;
receive a marked up audio broadcast file from the client computing device, wherein the marked up audio broadcast file refers to the audio broadcast style sheet and comprises at least one tag that delineates at least one section that corresponds to the at least one section in the audio broadcast style sheet and wherein the marked up audio broadcast file refers to at least one audio file for the at least one section;
parse the marked up audio broadcast file consulting the audio broadcast style sheet;
render each section of the audio broadcast based on the marked up audio broadcast file, the at least one audio file, and the audio broadcast style sheet to form a rendered audio broadcast;
store the rendered audio broadcast in a storage device at the server data processing system; and
send the rendered audio broadcast to client devices that subscribe to the audio broadcast using a syndication format.

9. The data processing system of claim 8, wherein receiving the marked up audio broadcast file comprises:
generating the marked up audio broadcast file in an audio broadcast creator tool.

10. The data processing system of claim 9, wherein generating the marked up audio broadcast file comprises:
receiving a template marked up audio file in the editor; and
editing the template marked up audio file to form the marked up audio broadcast file.

11. The data processing system of claim 8, wherein the one or more style attributes comprise a foreground volume attribute that sets a foreground volume level for a foreground audio file for a given section of the audio broadcast.

12. The data processing system of claim 8, wherein the one or more style attributes comprise a background volume attribute that sets a background volume level for a background audio file for a given section of the audio broadcast.

13. The data processing system of claim 8, wherein the one or more style attributes comprise a background file attribute that sets a background audio file for a given section of the audio broadcast.

14. The data processing system of claim 8, wherein the one or more style attributes comprise a mix attribute that sets a mixing type for a given section of the audio broadcast, wherein rendering each section of the audio broadcast comprises mixing a background audio file and a foreground audio file for the given section based on the mix attribute.

15. A method, in a server computing device, for creating an audio broadcast, the method comprising:
receiving an audio broadcast style sheet from a client computing device, wherein the audio broadcast style sheet sets one or more style attributes for at least one section of the audio broadcast;
receiving a marked up audio broadcast file from the client computing device, wherein the marked up audio broadcast file refers to the audio broadcast style sheet and comprises at least one tag that delineates at least one section that corresponds to the at least one section in the audio broadcast style sheet and wherein the marked up audio broadcast file refers to at least one audio file for the at least one section;
parsing the marked up audio broadcast file consulting the audio broadcast style sheet;
rendering each section of the audio broadcast based on the marked up audio broadcast file, the at least one audio file, and the audio broadcast style sheet to form a rendered audio broadcast;
storing the rendered audio broadcast in a storage device at the server computing device; and sending the rendered audio broadcast to client devices that subscribe to the audio broadcast using a syndication format.

16. The method of claim 15, wherein receiving the marked up audio broadcast file comprises:
generating the marked up audio broadcast file in an editor.

17. The method of claim 16, wherein generating the marked up audio broadcast file comprises:
receiving a template marked up audio file in the editor; and
editing the template marked up audio file to form the marked up audio broadcast file.

18. The method of claim 15, wherein the one or more style attributes comprise a foreground volume attribute that sets a foreground volume level for a foreground audio file for a given section of the audio broadcast.

19. The method of claim 15, wherein the one or more style attributes comprise a background volume attribute that sets a background volume level for a background audio file for a given section of the audio broadcast.

20. The method of claim 15, wherein the one or more style attributes comprise a background file attribute that sets a background audio file for a given section of the audio broadcast.

21. The method of claim 15, wherein the one or more style attributes comprise a mix attribute that sets a mixing type for a given section of the audio broadcast, wherein rendering each section of the audio broadcast comprises mixing a background audio file and a foreground audio file for the given section based on the mix attribute.

* * * * *